United States Patent [19]

Berretz

[11] 4,196,004

[45] Apr. 1, 1980

[54] CORROSION RESISTANT GLASSES THAT CONTAIN CHEMICAL ADDITIVES FOR APPLICATION OVER METAL SUBSTRATES

[76] Inventor: Manfred Berretz, Ponca City, Okla.

[21] Appl. No.: 888,832

[22] Filed: Mar. 22, 1978

[51] Int. Cl.² .......................... C03C 5/00; C03C 7/02; C03C 7/04
[52] U.S. Cl. .................................. 106/48; 106/14.05; 427/376.4
[58] Field of Search ............................ 106/14.05, 48; 427/376 C

[56] References Cited

U.S. PATENT DOCUMENTS

| | | | |
|---|---|---|---|
| 2,487,119 | 11/1949 | Fenton | 106/48 |
| 3,051,589 | 8/1962 | Sanford et al. | 106/48 X |
| 3,285,773 | 11/1966 | Dunning | 106/48 X |
| 3,380,838 | 4/1968 | Sack | 106/48 X |
| 3,507,687 | 4/1970 | Laird | 106/48 X |
| 3,836,373 | 9/1974 | Ault et al. | 106/48 |
| 3,867,166 | 2/1975 | Sullivan | 106/48 X |

FOREIGN PATENT DOCUMENTS

| | | | |
|---|---|---|---|
| 256187 | 3/1970 | U.S.S.R. | 106/48 |
| 416235 | 8/1974 | U.S.S.R. | 106/48 |

Primary Examiner—Helen McCarthy

[57] ABSTRACT

Protective coatings for alloys, mild steel, and enameling iron that has high resistance to corrosive attack and superior thermomechanical properties over ordinary glass or enamel coatings is disclosed. The desired properties are imparted to the coatings by various chemical additions during the milling procedures.

11 Claims, No Drawings

CORROSION RESISTANT GLASSES THAT CONTAIN CHEMICAL ADDITIVES FOR APPLICATION OVER METAL SUBSTRATES

BACKGROUND OF THE INVENTION

1. Field of the Invention

The field of the invention relates to corrosive resistant glasses and the method of preparing such glasses that contain chemical additives whereby the glass can be used as a protective coating for a substrate metal.

2. Description of the Prior Art

Applicant is aware of the following U.S. patents which are believed to relate to and disclose the most relevant prior art.

The Adlassnig U.S. Pat. No. 2,851,376 relates to porcelain or ceramic enamels and is directed particularly to a method for producing vitreous enamel coatings having especially high impact resistance and improved resistance against temperature changes and without at the same time lessening resistance against chemical attack.

Prior to being applied to the base metal, the enameling powder is mixed with an additive substance that has a very high melting temperature and which is insoluble in the molten enamel. A polyamorphous layer having many phase boundry surfaces within the enamel layer results thereby preventing the melting of the enameling powder into a homogeneous glass-like layer. The additive substance is mixed with the base enameling powder in such a quantity that upon firing, melting of the enamel particles into a homogeneous glass-like layer is prevented by the finely divided additive particles. The quantity of additive substance can vary between 2 and 35 percent, depending upon the characteristics of the particular additive material used. A single additive or a mixture of two or more additives can be used.

The additive substances used are the carbides, borides, silicides or nitrides of the transition metals of the fourth, fifth, and sixth group of the periodic table, namely titanium, zirconium, chromium, vanadium, molybdenum, and tungsten. In addition, the carbides of boron and silicon can be used. Besides these additive materials, under certain conditions barium sulfate, zirconium silicate and powdered quartz in the amount of 5 to 15 percent can be added.

The process for producing a vitreous enamel layer of intimately mixed vitreous enamel and additive substance can follow the route of first heating the mixture to a temperature above the softening point so that a coherent mass is formed and then finely dividing the coherent mass after cooling. An enameling mixture is then formed, the base metal is coated with this mixture and then heated in order to fuse the mixture thus producing an enamel layer.

A second approach is mixing the additive substance with only a portion of the vitreous enamel in a proportion of one to one and then firing the mixture at a temperature above the softening point in order to form a coherent mass. This mass is then finely divided and mixed with the other portion of the vitreous enamel so as to form an enameling mixture. The mixture is coated on a base metal and then fused to the metal at the appropriate temperature.

A third approach is to coat the base metal with a layer of vitreous enamel and fusing this layer to the metal. Over the top of this layer is placed one of the above mentioned enameling mixtures and the two are fused together to form a composite layer of enamel.

The disclosure of U.S. Pat. No. 2,851,376 differs from my inventive concept in that this reference teaches the need for the addition of various refractory materials to the enameling powder. These additions range from 2 to 35% by weight and are of one of the following types: carbides, borides, silicides, nitrides, barium sulfate, zirconium silicate and quartz. All but the last three are complexed with a transition metal such as titanium, zirconium, chromium, vanadium, molybdenum and tungsten. Excluding the quartz, none of these additives are of any practical use as additives in my coatings. The improved thermomechanical resistance they impart to a coating is outweighed by their reduced corrosion resistance.

The additives which I add to the enameling powder or host glass increases the thermomechanical resistance while at the same time maintaining high corrosion resistance.

Adlassnig's coatings are prepared by introducing the additives to the enameling powder and then heating the mixture to a temperature above the softening point so that a coherent mass is formed. This mass is then made into an enameling mixture that can be applied to the base metal. My coating circumvents the need to heat to the softening temperature. An enameling mixture is immediately prepared to which my additive substances have already been added. This mixture is then applied to the proper metal substrate. It is also important to remember that unless stainless steel is being coated my composite is never applied directly onto the base metal. Standard enameling techniques are used that require an intial underlying ground coat so as to provide the needed adherence to the metal, whereas U.S. Pat. No. 2,851,376 appears to be what is known as a "direct on coating" in that it does not get a "ground" coat.

The Stookey U.S. Pat. No. 2,920,971 discloses and describes the production of ceramic material by divitrification or crystallization of a glass. The ceramic material consists essentially of a multiplicity of interlocked inorganic crystals dispersed in a glass matrix. A formulation of the proper chemical constituents is melted as is done with a normal glass and is then made into a solidified mass of the desired geometry. This mass is a glass in the true sense, but is made to undergo massive crystallization by use of an appropriate heat treating method. The heat treating causes a dramatic change in the chemical properties and structural make-up of the initial glass matrix. The devitrification or crystallization not only changes the chemical compounds that make up the system but also drastically changes the physical properties of the original glass. An improvement in the thermomechanical properties is the most evident change over that of the original glass.

Stookey's heat treating cycles essentially involve cooling the initial melt to form a glass, and then exposing the glass to a temperature between the maximum nucleation temperature and the annealing temperature of the glass for an appropriate time period and finally increasing the temperature of the glass to a level at which the glass ingredients crystallize. The temperature is kept below the point at which the predominant crystalline phase will redissolve, and is kept at this temperature until at least 50% of the system is crystalline.

A second method of this reference involves cooling the glass after melting and pulverizing it to a fine powder. The powder is mixed thoroughly with at least one finely divided ceramic material of greater refractoriness than the glass, and the mixture is molded to shape and heated to fuse the glass. This material then goes through the same heat treating cycles as above in order to precipitate the desired crystals from the glass ingredients.

In order to get the desired changes during the heat treating cycles the glass formulations must be carefully controlled. Only certain combinations of the appropriate chemicals will give the desired chemical and physical properties. The three major constituents are $SiO_2$, $TiO_2$, and $Al_2O_3$ with at least one glass network former selected from the group consisting of $SiO_2$, $P_2O_5$, $B_2O_3$ and $GeO_2$, and at least one metal oxide selected from the group consisting of $Li_2O$, $BeO$, $MgO$, $CaO$, $ZnO$, $SrO$, $CdO$, $BaO$, $PbO$, $MnO$, $FeO$, $CoO$ and $NiO$. A combined weight of glass network formers including $Al_2O_3$, $TiO_2$ and $SiO_2$ and at least one basic metal oxide is 90% by weight with $TiO_2$ constituting 2-20% of the combined weight. The range of compositions capable of being melted and cooled to form glasses can be broadened by the judicious addition of other compatible metal oxides, particularly the fluxes $Na_2O$, $K_2O$, and $B_2O_3$ in limited amounts.

Depending on the initial glass formulation, the crystal systems that are believed to be present in the final ceramic material of this reference are cordierite (2 $MgO$ 2 $Al_2O_3$· 5 $SiO_2$), beta spodumene ($Li_2O·Al_2O_3·4\ SiO_2$), beryl (3 $BeO·Al_2O_3·6\ SiO_2$), anorthite ($CaO·Al_2O_3·2\ SiO_2$), zinc spinel or gahnite $ZnO·Al_2O_3$), and willemite (2 $ZnO·SiO_2$).

The disclosure of the Stookey patent can be distinguished from my inventive concept in several different categories. First, Stookey deals with glass that crystallizes to form a ceramic material which is a separate entity in itself and is not used as a coating material. Unlike my glass matrix that contains uniformly dispersed crystal additives, Stookey's material is not applied to a metal substrate. The chemical constituents that make up his composite impart a very low coefficient of thermal expansion to the ceramic material thus making it impossible to apply over a metal base. My formulations give a rather high coefficient of thermal expansion in relation to the Stookey material thus making them easily adjustable for most metals that can be coated.

Stookey's material must be put through a heat treating cycle in order to generate at least 50% crystallization. This step is not used in my coating since I add the crystals as separate entities which do not arise from the chemicals that make up the original glass formulation. I have a separate glass formulation that retains its unique identity and to this is added the various crystalline compounds, and these compounds retain their separate identity. My glass provides a matrix for the crystalline compounds and in combination they impart the needed physical and chemical properties.

Stookey's composites start out as a glass and then are made into a crystalline ceramic material. This step involves drastic changes in the chemical compounds that make up the original glass and the final ceramic material. Drastic changes in the thermal properties and coefficient of thermal expansion occur between the starting glass and the final ceramic material.

The coatings that I apply to the various metal bases undergo very little change in their thermal properties and coefficient of thermal expansion.

The coatings that I have developed are basically oriented towards corrosion resistance while the ceramic materials in the Stookey patent are oriented more towards thermomechanical properties. Stookey's material in no way could withstand the corrosive environment that my coatings come in contact with. I am, of course, also interested in the thermomechanical properties of my glass.

The advantage of my new coatings over the prior art vitreous enamel coatings is the combination of excellent corrosion resistance coupled with drastic improvements in the thermomechanical properties. The limiting properties in the thermomechanical properties of my glass is the maintaining of the corrosion resistance. Since Stookey's materials are not oriented towards corrosion severity they have far better thermomechanical properties than do my coatings.

The basic chemical ingredients of Stookey's materials are quite different from the chemical ingredients which make up my coatings. Stookey's formulations are very high in aluminum oxide and occasionally in boron trioxide. These chemical compounds are very detrimental in the types of coatings I produce. I use virtually no boron trioxide and very little (less than 3%) aluminum oxide, since both these constituents have an adverse affect on the overall chemical resistance of the glass.

The Sanford, et al U.S. Pat. No. 3,368,712 relates to the method of preparation and the method of application to a base metal, of semicrystalline or devitrified glasses. These glasses are applied to specific metal substrates to protect the metal from thermal, mechanical and chemical deterioration. Partial crystallization of the glass can be carried out under controlled conditions for the production of a semicrystalline material having a high strength, great errosion and abrasion resistance, and other properties superior to that of uncrystallized or amorphous coatings.

It is the object of this reference to: (1) provide improved non-metallic semicrystalline coating having the chemical resistance, impermeability and other desirable characteristics of the glass or vitreous enamel coatings, coupled with greatly improved mechanical strength, thermal shock, impact and abrasion resistance; (2) develop a method for appling a semicrystallized coating to metal substrates.

This reference is based, at least in part, upon the discovery that certain glass compositions may be crystallized, that the crystallization may be accelerated by the physical form of the amorphous glass, that the amorphous glass may be applied to metallic bases and crystallized to form a poly-crystalline-amorphous ceramic coating, and that the properties of the coating material may be adjusted with relation to the properties of the base metal and to the environmental conditions to which the coating will be exposed. Besides a marked increase in the thermomechanical properties of the crystallized coating over the amorphous glass, the major aspects of these crystallized coatings is their corrosion resistance to alkaline an acidic solutions.

The glass ingredients crystallize producing a smooth continuous coating of semicrystalline material that has a substantial compressive stress not greater than about 30,000 psi. Most of the crystals are not larger than about 100 microns in size and constitute less than 50% by weight of the total compositions.

The chemical make-up of the initial glass is 40 to 70% $SiO_2$, 2.5 20% $Al_2O_3$, 10 to 25% of alkali oxide ($Li_2O$, $Na_2O$ and $K_2O$), and at least one constituent selected from the group consisting of $CeO_2$, $MnO_2$, $ZrO_2$, $TiO_2$, $Sb_2O_3$, $Cr_2O_3$, $Fe_2O_3$, $CaO$, $ZnO$, $SrO$, $MgO$, and $LiF$.

This last group of chemical compounds can be categorized in the broad sense as nucleating agents. A nucleating agent is something that provides a site for crystals to grow, in other words they stimulate or enhance crystallization. The chemicals are smelted together at a temperature between 2000° F. (1093° C.) and 2400° F. (1316° C.) to form a glass which is then cooled rapidly to room temperature by quenching in water. This quenching action causes the glass to shatter into small particles called frit. The frit is dried and then heat treated at some temperature between 200° and 700° C. for a period of time to initiate crystallization from the glass composition. The frit is then ground either into a powder or into a liquid material called slip. The powder is used in hot and cold dust application techniques while the slip is applied using spraying techniques.

Once the applied coating has been dried it is fired down to a smooth continuous glossy finish. The coated article is then heat treated to generate the desired degree of crystallization that will impart the desired chemical and mechanical properties to the coating.

The actual crystal species present in the semicrystalline coatings are not actually stated, but from the formulations it appears that they are lithium silicates and lithium aluminum silicate. Additional species might be present but at a much lower concentration.

There is similarity between Sanford's disclosure and my inventive concept in that they both are concerned with corrosion resistant and thermomechanical resistant coatings for an assortment of metal bases. Sanford's coating is a semicrystallized or devitrified coating where the glass ingredients crystallize and thereby giving the final product. My material does not undergo auto or self crystallization and in no way does any ingredient of the corrosion resistant glass constituent partake in the development of any crystal structure. Sanford's coating undergoes a complete phase transformation from a true glass to a semicrystalline or ceramic like material that is a composite of a glass matrix encompassing individual crystal species. The final glass matrix is not of the same chemical make-up nor does it have the same physical properties as those of the precrystallized glass because certain chemical compounds are removed from the glass in order to develop the crystal structure. This situation is completely contrary to what occurs in my coating in which the glass host or matrix retains all of its chemical compounds and thus maintains its glass characteristics and its excellent resistance to corrosive attack and its unique physical properties. Likewise the added crystal species maintain their individual identity and the combination of the two (glass and crystals) give chemical and thermomechanical properties superior to either of the individual phases. I do not see a drop in the corrosion resistance from my starting material to the final product.

The degree of crystallization in the Sanford coating is kept below 50% whereas my coating ranges from 5 to 80% crystal content. The actual crystal species present in Sanford's coating are usually some form of lithium silicate and lithium aluminum silicate while I have a wider range of crystals such as lithium titanate, lithium silicate, lithium aluminum silicate, magnesium titanate, and/or magnesium silicate. I add crystal species during the milling of the powder and slip while Sanford obtains his crystal species from the original glass formulation. The amount of crystal material which I add can range from 5 to 80% by weight and comprises 30 to 85% by weight of what is left on a 325 mesh screen plus 15 to 70% by weight of what passes through a 325 mesh screen.

The chemical compounds which I use in producing the coatings differ quite a bit from those used in the Sanford coating, whose coatings range from 2.5 to 20% aluminum oxide while my coating is kept below 3% in aluminum oxide because of its adverse affect on corrosion resistance. Likewise, Sanford must use what is known as a nucleating agent, usually lithium fluoride, to stimulate crystal growth. This is not necessary with my coating, for the crystal species added during the milling process are insoluble in the host glass, thus they are never taken into solution, wherefore they become evenly dispersed throughout the glass matrix during the firing cycle. Additional firing cycles do not cause excess crystal structure to form in my glass, such as occurs with the Sanford coating.

Heat treating of the glass in order to generate crystals, prior to milling the material into a powder or slip, is commonly done with the Sanford coating. This, of course, is not necessary with my coating since I do not derive my crystal structure from the initial ingredients of the glass.

OBJECT OF THE INVENTION

The protection of metals and alloys with a coating of glass or enamel is a process that has been well known for some time. Such coatings have found wide use in the chemical industry because of their excellent resistance to chemical attack particularly at high temperatures. However, the shortcomings of such coatings have been their limited range in the areas of impact loads, thermal shock resistance and abrasion resistance. In recent years the development of nucleated or semicrystallized coating has broadened the thermomechanical working range of the coated items, however, these coatings have had, or are characterized by, a negative affect in the area of corrosion resistance. The nucleated or semicrystallized coatings are less resistant to corrosive attack particularly in the region of base or alkaline etch. This has led some producers of semicrystallized coated equipment to apply a layer of corrosion resistant glass or enamel over the top of the crystallized coating thereby hoping to have both high corrosion resistance and excellent thermomechanical properties.

The present invention circumvents the problem of loss of corrosion resistance with increased thermomechanical resistance, thus eliminating the need for a protective layer of corrosion resistant glass.

It is known in the art that the addition of from 5 to 15 percent of finely ground quartz to a vitreous enamel prior to application, will improve the coatings resistance to deterioration by chemical attack, rapid changes in temperature, and sudden impact loads. I have discovered that certain unique substances can be added to an already acid and alkaline resistant "host" glass and thereby dramatically improve the thermomechanical properties of the host glass. The compounds added to the glass retain their unique identity and can easily be identified from the glass matrix using established physical measuring techniques. The host or parent glass does not contribute chemical or elemental constituents of its own in making up the composition character of the additive substance since it too retains its separate identity.

It is known in the art that under controlled conditions, partial crystallization of a glass can be carried out so that the character of the glass can be changed to give improved strength, abrasion resistance and thermal shock resistance. The prior art coatings, as far as semi-crystallized glass is concerned, used a system that under proper thermal conditions undergoes self or auto crystallization.

A prime object of the present invention is to provide a coating material that does not need to go through the cycle of self-nucleation and self-crystallization, but wherein the coating material contains well developed and uniformly dispersed individual chemical constituents which are added to the glass-forming ingredients during the milling process of the liquid and/or powder enamels prior to application onto the metal to be coated.

An object of the present invention is accomplished by first formulating a coating that has exceptional acid, alkaline and water resistance properties and that has the proper thermal coefficient of expansion for a specific metal substrate. Since glass and devitrified coatings are stronger in compression than in tension it becomes necessary to adjust the properties of the coating to conform to the properties of the base metal so that a metal-coating system will be formed wherein the coating will be subjected to compressive stresses within proper limits.

It has been established that the addition of certain chemical compounds to the base glass does not substantially alter the thermal expansion coefficient, thus making the initial glass formulation the dominating factor in the expansion properties.

The properties of the metal substrate are the limiting factors in the firing temperature and the firing time of the coating. The coating must be easily fusible within the temperature limitations imposed by the metal that is being coated, and from the standpoint of economical practicality the firing temperature of the coating must be relatively low. Since a continuous coating must be obtained, it is necessary for the coating to completely fuse in the temperature limits set up by the base metal. The subject invention provides a coating with substantially low fusibility so that a smooth continuous and consistent coating can be obtained that is encompassed by the limitation set forth by the metal substrate.

The practice of preheating glass, while still in the frit stage, to generate some independent phases is not required nor necessary in practicing the present invention since the total character of my unique coating is determined by the type of additive substances and the percent added to the host or parent glass. Excess phase separation, from extended firing cycles, is not a factor in my coating because all physical and chemical changes are predetermined by the percentage of material added to the frit in the milling process.

Another object of the invention is that by adjusting the formulation of the host or parent glass and materials which are added thereto, the properties of the resultant coating can be altered so that the desired resistance to various environmental conditions can be obtained.

To summarize, the inventive concept is directed to a composite glass coating and a method of preparing same, wherein a host or parent glass formulation is provided with one or more additive substances which impart superior mechanical strength, impact and abrasion resistance to the host or parent glass with no impairment or reduction in its corrosion resistance. The composite glass coating is used in accordance with the established enameling techniques of spraying and dusting.

DESCRIPTION OF THE PREFERRED EMBODIMENTS

Uniformly satisfactory results have been obtained in those instances in which the host or parent glass comprised glass frits formulated from the ingredients set forth in Tables I and II, wherein Table I sets out the glass formulation for the transparent acid and alkaline resistant species, whereas Table II contains the formulation for the opacified glass that is particularly resistant to acid and alkaline etch.

Table I

| | |
|---|---|
| $SiO_2$ | 48-70 |
| $TiO_2$ | 1.5-10 |
| $ZrO_2$ | 2-10 |
| $Li_2O$ | 0.5-12 |
| $Na_2O$ | 5-20 |
| $K_2O$ | 1-5 |
| $MgO$ | 1-4 |
| $CaO$ | 1.5-6 |
| $CaF_2$ | 1-6 |
| $SrO$ | 1-5 |

Table II

| | |
|---|---|
| $SiO_2$ | 45-72 |
| $TiO_2$ | 12-20 |
| $ZrO_2$ | 5-16 |
| $Li_2O$ | 0.5-5 |
| $Na_2O$ | 6-12 |
| $K_2O$ | 0-6 |
| $MgO$ | 0.5-4 |
| $CaO$ | 1-4 |
| $P_2O_5$ | 2-8 |
| $ZnO$ | 0-4 |
| $AL_2O_3$ | 0-3 |
| $B_2O_3$ | 2-8 |

The aforesaid batch compositions are smelted between 1900° F.-2400° F. (1038° C.-1316° C.) and then water quenched after which the resultant frit is combined with selected, insoluble additives which will give the desired improved physical and chemical properties to the final product. The glass frit and selected additives are ground into a fine powder or a slip, and both the additive and the slip must be of the appropriate fineness to insure consistent application.

The "selected additives" that are added to the parent glass compositions of Tables I and II fall into two categories:

(1) those added to compositions from Table I and (2) those added to compositions from Table II.

The additives to the optically clear frit derived from Table I are one or more of the following:

Lithium Titanate, Lithium Silicate, Lithium Aluminum Silicate, Silica, and Magnesium Titanate in proper ratios to give the desired physical and chemical properties as determined by the service conditions and the type of base metal to which the coating is applied.

The additives to the opaque frit, derived from Table II, are one or more of the following:

Magnesium Silicate, Lithium Silicate, Silica, and Lithium Aluminate. These are added in the proper ratio in order to obtain the desired physical and chemical resistance as determined by the service conditions and the type of base metal to which the coating is applied.

The chemical constituents used as mill additives in both cases above are obtained commercially and a typical mill additive may have the following composition:

| | |
|---|---|
| host glass (Table I) (Table II) | 1000 gr. |
| Lithium Silicate | 100 gr. |
| Bentonite (clay) | 25 gr. |
| Syloid (electrolyte) | 5 gr. |
| Water | 500 cc |

The chemical additives are ground or milled and then screened through the proper mesh sieve before they are added to the frit to make the powder or slip. Too coarse a particle size will have several adverse affects on the character of the coating. First the particles will not be distributed evenly thereby giving dense pockets of additive substances that will have drastically different physical and chemical properties than the areas of lesser concentrations. This type of situation will lead to the development of undesirable strains and stresses between the phase boundaries. The continuous melting of the coating material will be interrupted by concentrated pockets of chemical additives thus giving an uneven and rough texture to the coating surface. By grinding the dry ingredients of each batch of mill additives in a ball mill, the individual particles of the ingredients will be thoroughly distributed throughout the mass whereby the additives are properly dispersed throughout the host glass matrix whereby the continuity and quality of the coating can easily be controlled.

Too fine a particle size will lead to undesirable separation in the powder application. The finer ground additive materials will separate from the coarser frit particles during the mechanical aspects of the application, thereby depositing a layer of higher melting material followed by a layer of the larger or more coarse frit particles. This will adversely affect the melting and the continuity of the powder coating. On the other hand the slip or wet slurry does not have its melting affected or coating continuity destroyed by the addition of too finely ground chemical additives.

The various additive substances are ground in a ball mill if grinding is necessary since in some cases the additive substances are already ground and need only to be screened through the proper size sieve. The fineness of −100 mesh +325 mesh is of the proper range to give the desired properties to the final coating. The powders are screened through a 100 mesh screen (0.150 mm openings) and what remains on a 325 mesh screen (0.043 mm openings) is used in conjunction with what passes through the screen. The ratio can range from 30–85% of the +325 mesh screen or what is left on the 325 mesh screeen plus 15 to 70% of the finer material that passes through the 325 mesh screen.

After the proper ratio is established for the individual material it is combined with the other additive subtances that are to comprise the total addition to the parent or host frit. The additive substances and their concentrations are determined by the desired properties of the coating material.

The additive materials comprise from 5 to 80% by weight of addition to the mill formulation. In other words, if a mill formulation constitutes 100 kilograms of either the transparent or opaque parent or host frit or glass, an addition of additive chemical substances to the batch is made that ranges from 5 kilograms to 80 kilograms. The percent added is determined by the melting or softening range desired, and the chemical and thermomechanical properties the coating must have. The chemical additives, the parent frit and the other mill constituents such as water, electrolytes and suspending agents are ground until the proper consistency is obtained that will allow easy and uniform application. A typical electrolyte may be barium or sodium chloride, or any ionizable compound, whereas the suspending agents may comprise clay, such as Bentonite or the like.

The powder materials used for drying dusting and hot dusting are prepared using the same range of concentrations of additives as in the various slip formulations. The combined solid materials are ground until a uniform powder mixture is obtained with the proper particle size that will allow for the easiest and most efficient application.

In the prior art coatings, as the various heat cycles continue the crystalline structure of the glass coating increases with the result that the coefficient of expansion of the glass coating changes.

In the present invention changes in the coefficient of thermal expansion are kept at a minimum since crystallization does not come about by changes in the parent glass composition. By maintaining a constant expansion coefficient the maximum desirable compressive stress on a concave surface can be obtained and failure of the coating on convex areas can be eliminated. Depending on the type of service the coating will be exposed to, a formulation change can easily be accomplished, by slight changes in the type of materials added and the percent of additive in relation to the parent glass, to meet the particular needs. Using my method, corrosion resistance can be kept at a maximum while the thermomechanical properties can be increased dramatically over a normal corrosion resistant coating. It should be pointed out, that by using the variable additive technique, that the formulation may be altered for use on different portions of the same object, such as, by way of example, a 5000 gallon reactor vessel to be coated in order to develop different residual stresses on areas of different configurations.

With reference now to the various additives, it will be noted that lithium Titanate, Lithium Silicate and Silica substantially enhance the anticorrosion properties of the host or parent glass in which they are embedded as insoluble ingredients thereof.

The Lithium Aluminum Silicate, Lithium Aluminate and Magnesium Silicate enhance and substantially improve the temperatures to which the composite glass compositions can be subjected whereas Magnesium Titanate substantially enhances the mechanical properties, that is, the impact resistance of the parent or host glass.

The objects or equipment to be coated with the above formulations comprise fabricated mild steel, stainless steel, or any other suitable metal. The metal objects are first prepared using standard techniques that have been developed for porcelain enameling. The metal is first annealed; then subjected to an annealing or heat treating cycle to remove oil and grease from the surface and to eliminate gases trapped in the steel and to reduce gas formation from entrapped carbon. The annealing temperature is usually above the temperature required to apply the ground coat or any coating that is used to cover the metal. The surface of the metal is then thoroughly cleaned and sand blasted to remove all traces of foreign matter, scale and etc. that might have an adverse affect on the adherence and continuity of the coating to be applied. The clean, sand-blasted, metal surface is then given a coat of ground-coat enamel, using standard application techniques. The ground coat enamel is specifically formulated to give maximum adherence or bonding with the substrate metal and thereby providing a secure anchor point for the subsequent coating of the present invention.

A typical formulation of a suitable ground coat enamel or glass is:

| | |
|---|---|
| Feldspar | 380 gr. |
| Borax | 100 gr. |
| Silica | 330 gr. |
| Fluorspar | 48 gr. |
| Soda Ash | 54 gr. |
| Sodium Nitrate | 50 gr. |
| Lithium Carbonate | 30 gr. |
| Cobalt Oxide | 10 gr. |
| Aluminum Oxide | 30 gr. |

The thermal expansion coefficient of the ground coat enamel is somewhat lower than that of the base metal, but it is higher than that of the subject coating. The ground coat is prepared using standard smelting techniques so that a homogeneous glassy material is obtained. This material is generally reduced to a coarse frit by pouring the molten glass into cold water. The resulting granular material is then ground in a ball mill together with water and the appropriate mill additives to form a slip of slurry. The slip is applied to the metal using spraying or dipping techniques. The coating is dried and then fired in a temperature range of 1600° F. (871° C.) to 1700° F. (927° C.). The firing cycle causes the ground coat to fuse together to a smooth continuous finish and develop a strong bond with the base metal.

The subject coatings are applied directly over the ground coat using any one of several different techniques since the particular method in any particular instance is dependent on the size, shape and type of finished surface desired. If the size and shape allows, a piece can be hot dusted. Hot dusting utilizes the dry ground powder which is applied directly to and over the hot molten ground coat.

Wet spray, dry dusting utilizes a coat of sprayed-on wet mill formulation followed immediately by a coating of dry powder. The coating is first dried and then fired out. Wet spray application involves spraying the metal or the metal plus ground coat with the slip, drying it and then firing. The firing temperature for the subject coatings ranges from 1450° F. (788° C.) to 1680° F. (916° C.) wherein the fired-down coating has a smooth, glossy finish.

It will be understood that the desired coating properties are determined in each instance by the amounts and identities of the particular additives which have been added to the parent or host glass formulation. Additional coatings may be applied after each firing cycle until the proper or desired overall thickness of the ceramic coating is attained.

Additional firing cycles will not produce a dull mat finish to the surface of the coating as occurs as the result of excess phase separation in the prior art coatings since most phase separation occurs during the initial or any subsequent firing cycles to which the ceramic coating of the present invention is subjected.

To summarize, the finish coatings have a corrosion resistance identical to the host or parent glass but are characterized by a substantially improved resistance to abrasion, impact loads, and thermal shock than the parent or host glass.

It should be understood that one or more of the hereinabove mentioned additives will be added to one or the other of the parent or glass formulations of tables I and II for imparting the desired increase in mechanical strength, impact, abrasion resistance, and resistance to thermal shock of the host or parent glass, and by way of example, in restriction it has been established that the addition of Magnesium Silicate, and/or Magnesium Titanate, and/or Lithium Aluminate enhances to a measurable extent the mechanical strength of the host or parent glass.

The addition of Magnesium Titanate and/or Lithium Aluminate enhances the impact strength of the resultant ceramic coating by appreciably increasing its resistance to the application of sudden loads.

The addition of Magnesium Titanate and/or Lithium Aluminum Silicate and/or Lithium Aluminate appreciably enhances the abrasion resistance of the surface of the resultant, fired, ceramic coating.

The addition of Lithium Titanate and/or Lithium Silicate and/or Lithium Aluminum Silicate enhances the resistance of the parent or host glass to sudden changes in temperature, viz, its ability to withstand thermal shock.

The particular quantity and identities of the additives used in any particular application is determined in a sense by trial and error wherein the total amounts of additives for a 100 kilogram mill formulation is in the range of from 5 to 80 kilograms.

By way of a summary, the addition of Magnesium Silicate, Magnesium Titanate and/or Lithium Aluminate enhances the overall mechanical strength or the impact resistance of the final product, that is its ability to resist the application of a sudden load.

The addition of Magnesium Titanate, Lithium Aluminum Silicate, Magnesium Silicate and/or Lithium Aluminate enhances the abrasion resistant qualities of the final product.

The addition of Lithium Titanate, Lithium Silicate and/or Lithium Aluminum Silicate enhances the ability of the final product to resist thermal shock, as caused by sudden changes in temperature.

The following examples set forth three different formulations; the first example recites a formulation wherein the thermal shock resistance of a coated product has been enhanced. The second example recites a formulation wherein the impactresistance of a coated product has been enhanced, whereas the third example recites a formulation wherein the abrasion-resistant qualities of the coated product has been materially improved.

In considering the following examples the amount or percentage of the various "additives" as hereinbefore defined, are directed to the preferred or most desirable, or optimum amounts, it being understood that the desired charcteristics of the final product will be enhanced by the addition of as little as 5 grams or 5%, to as much as 80 grams or 80% of the "additions" per 100 grams of the host glass.

EXAMPLE #1

An optically clear host or parent glass of the following compositions were prepared by smelting at 2200° F. and then water quenched:

| | |
|---|---|
| $SiO_2$ | 63.0 |
| $TiO_2$ | 4.0 |
| $ZrO_2$ | 9.0 |
| $Li_2O$ | 1.8 |

| | |
|---|---|
| Na₂O | 7.8 |
| K₂O | 6.4 |
| MgO | 1.0 |
| CaO | 2.0 |
| CaF₂ | 2.0 |
| SnO | 3.0 |
| | 100 |

The resulting frit was ground in a ball mill with the following additives:

| | |
|---|---|
| Host Glass | 100.0 gr. |
| Lithium Silicate (additive) | 15.0 gr. |
| Bentonite | 9.5 gr. |
| Syloid | .5 gr. |
| Water | 50.0 gr. |

Fifteen percent of Lithium Titanate, Lithium Aluminum Silicate, Silica, Lithium Aluminate or Magnesium Titanate can be substituted for the 15% of Lithium Silicate, and if desired two or more of the additives may be combined to comprise a total of 15 percent of additives. In other words, the aforesaid additives are "interchangeable," and selection is really one of economics, depending upon price and availability.

The Bentonite, Syloid, and water are utilized to suspend the additive.

The resultant slip was applied by spraying on 6"×6"×½ steel plates which had previously been coated with a ground coat, and fired at 1520° F. until a glossy surface was obtained. After cooling to room temperature they were heated to 250° F. for 20 minutes and quenched in water at room temperature. After examining, they were heated to 300° F. for 20 minutes and again quenched in water. The same procedure was repeated at an increased temperature of 50° F. until failure of the coating occurred. Failure occurred at 650° F. compared to 400° F. for ordinary glasses or enamels.

EXAMPLE #2

An opaque host or parent glass of the following composition was prepared by smelting at 2200° F. and then water quenched.

| | |
|---|---|
| SiO₂ | 48.4 |
| TiO₂ | 15.3 |
| ZrO₂ | 5.0 |
| Li₂O | 1.5 |
| Na₂O | 9.3 |
| K₂O | 5.7 |
| MgO | .5 |
| CaO | 1.5 |
| ZnO | 2.0 |
| Al₂O₃ | 1.0 |
| P₂O₅ | 2.0 |
| B₂O₃ | 7.8 |
| | 100.0 |

The resulting frit was ground in a ball mill with the following additives:

| | |
|---|---|
| Host glass | 100.0 gr. |
| Lithium Aluminate (additive) | 35.0 gr. |
| Bentonite | 2.5 gr. |
| Syloid | .5 gr. |
| Water | 50.0 gr. |

Thirty-five percent by weight of the host glass of Lithium Titanate, Magnesium Titanate, or Magnesium Silicate can be substituted for the Lithium Aluminate, or, as in Example 1, two or more additives, totaling 35% by weight of the host glass, may be added.

The resultant slip was applied by spraying on ½" diameter rods, 6" long, and fired at 1550° F. until a glossy surface was obtained. By means of letting a steel ball fall from increasing heights, the maximum height was determined at which the impact zone still remained undamaged. The impact resistance, derived from the product of the weight of the steel ball in kilograms and the height of the fall in centimeters, resulted in 30 cm.kg. with the above coating and about 10 cm.kg. with ordinary glasses or enamels.

EXAMPLE #3

The same host or parent glass in example #1 was ground in a ball mill with the following additives:

| | |
|---|---|
| Host Glass | 100.0 gr. |
| Lithium Aluminum Silicate (additive) | 40.0 gr. |
| Bentonite | 2.5 gr. |
| Syloid | .5 gr. |
| Water | 50.0 gr. |

Forty percent by weight of the host glass of Magnesium Titanate, Magnesium Silicate, or Lithium Aluminate may be substituted for the Lithium Aluminum Silicate, or two or more of the additives may be combined.

The resultant slip was applied by spraying on 4.33" square by ¼" thick steel plates and fired at 1530° F. until a glossy surface was obtained. A Porcelain Enamel Institute Abrasion Tester was used to compare the abrasion resistant to that of an ordinary glass or enamel. The above glass lost approximately 38% as much weight as the ordinary enamel tested under similar conditions.

The coatings in all three examples were tested for acid and alkali resistance using the normal industry test. In no instance was the chemical resistance reduced because of the mill additives.

In passing it should be noted that when two additives are utilized, one may comprise a coarser additive, that is, one which is retained on a 325 mesh screen and the other may comprise a finer additive, that is, one which will pass through a 325 mesh screen.

What is claimed is:

1. The method of enhancing the mechanical strength, impact, abrasion, and thermal shock resistance of both a transparent and opaque, acid, alkaline, and water resistant host glass which comprises the steps of incorporating into a frit of the host glass crystalline additives which are insoluble in the molten host glass in ratios of from 5% to 80% by weight of the host glass, said additives selected from one or more of the following chemical constituents:

Lithium Titanate
Lithium Silicate
Lithium Aluminate
Lithium Aluminum Silicate
Magnesium Titanate
Magnesium Silicate, wherein the transparent host glass is composed of the following ingredients:

| | |
|---|---|
| $SiO_2$ | 48-70 |
| $TiO_2$ | 1.5-10 |
| $ZrO_2$ | 2-10 |
| $Li_2O$ | 0.5-12 |
| $Na_2O$ | 5-20 |
| $K_2O$ | 1-5 |
| MgO | 1-5 |
| CaO | 1.5-6 |
| $CaF_2$ | 1-6 |
| SrO | 1-5 | and the opaque host glass is composed of the following ingredients:

| | |
|---|---|
| $SiO_2$ | 45-72 |
| $TiO_2$ | 12-20 |
| $ZrO_2$ | 5-16 |
| $Li_2O$ | 0.5-5 |
| $Na_2O$ | 6-12 |
| $K_2O$ | 0-6 |
| MgO | 0.5-4 |
| CaO | 1-4 |
| $P_2O_5$ | 2-8 |
| ZnO | 0-4 |
| $Al_2O_3$ | 0-3 |
| $B_2O_3$ | 2-8 |

2. The method of claim 1 wherein the host glass is initially smelted between 1900° F.-2400° F. (1038° C.-1316° C.) and then water quenched to provide a frit of the glass.

3. The method of claim 2 wherein the chemical constituents are added to and during milling of the frit of the host glass.

4. The method of claim 2 wherein the chemical constituents are added to frit of the host glass in comminuted form consisting of 30%-85% by weight of what is left on a 325 mesh screen and from 15%-70% by weight of what passes through a 325 mesh screen.

5. The method of claim 1 wherein the chemical additives which are added to frit of a transparent host glass are selected from one or more of the following: Lithium Titanate, Lithium Silicate, Lithium Aluminum Silicate, Magnesium Titanate.

6. The method of claim 1 wherein the chemical additives which are added to frit of an opaque host glass are selected from one or more of the following: Magnesium Silicate, Lithium Silicate, Lithium Aluminate.

7. The method of claim 1 which includes the steps of reducing the particles of the mixture of host glass frit and chemical additives to a powder for dry and hot dusting to a metal base to be provided with a ceramic coating.

8. The method of claim 7 which includes the steps of adding liquid to the powder to form a slip formulation thereof for application to a metal base.

9. A method of claim 8 which includes the steps of applying a mixture of a host glass and chemical additives to a metal base and thereafter subjecting said coated base to temperatures of 1450° F.-1680° F. (788° C.-916° C.) for providing a smooth continuous ceramic coating to said metal.

10. The method of enhancing the mechanical strength, impact, abrasion, and thermal shock resistance of both a transparent and opaque host glass of a ceramic coating which comprises the steps of incorporating into the frit of the host glass crystal additives which are insoluble in the molten host glass in ratios of from 5% to 80% by weight of the host glass wherein:

additives selected from one or more of the following chemical constituents increase resistance of the ceramic coating to thermal shock: Lithium Titanate, Lithium Silicate, Lithium Aluminum Silicate;

additives selected from one or more of the following chemical constituents impart mechanical strength to the ceramic coating: Magnesium Silicate, Magnesium Titanate, Lithium Aluminate;

additives selected from one or more of the following chemical constituents enhance the impact resistance of the ceramic coating: Magnesium Titanate, Lithium Aluminate; and additives selected from one or more of the following chemical constituents enhance the abrasion resistance of the ceramic coating: Magnesium Titanate, Lithium aluminum Silicate, Magnesium Silicate, Lithium Aluminate wherein the transparent host glass is composed of the following ingredients:

| | |
|---|---|
| $SiO_2$ | 48-70 |
| $TiO_2$ | 1.5-10 |
| $ZrO_2$ | 2-10 |
| $Li_2O$ | 0.5-12 |
| $Na_2O$ | 5-20 |
| $K_2O$ | 1-5 |
| MgO | 1-5 |
| CaO | 1.5-6 |
| $CaF_2$ | 1-6 |
| SrO | 1-5 | and the opaque host glass is composed of the following ingredients:

| | |
|---|---|
| $SiO_2$ | 45-72 |
| $TiO_2$ | 12-20 |
| $ZrO_2$ | 5-16 |
| $Li_2O$ | 0.5-5 |
| $Na_2O$ | 6-12 |
| $K_2O$ | 0-6 |
| MgO | 0.5-4 |
| CaO | 1-4 |
| $P_2O_5$ | 2-8 |
| ZnO | 0-4 |
| $Al_2O_3$ | 0-3 |
| $B_2O_3$ | 2-8 |

11. A ceramic coating characterized by increased mechanical strength, impact, abrasion, and thermal shock resistance which comprises a transparent or opaque host glass having incorporated therein crystalline chemical additives which are insoluble in the molten host glass in ratios from 5% to 80% by weight wherein said additives are selected from one or more of the following:
Lithium Titanate
Lithium Silicate
Lithium Aluminum Silicate
Lithium Aluminate
Magnesium Titanate
Magnesium Silicate,
wherein the transparent host glass is composed of the following ingredients:

| | |
|---|---|
| $SiO_2$ | 48-70 |
| $TiO_2$ | 1.5-10 |
| $ZrO_2$ | 2-10 |
| $Li_2O$ | 0.5-12 |
| $Na_2O$ | 5-20 |

|  |  |
|---|---|
| K$_2$O | 1-5 |
| MgO | 1-5 |
| CaO | 1.5-6 |
| CaF$_2$ | 1-6 |
| SrO | 1-5 | and the opaque host glass is composed of the following ingredients:

|  |  |
|---|---|
| SiO$_2$ | 45-72 |
| TiO$_2$ | 12-20 |
| ZrO$_2$ | 5-16 |
| Li$_2$O | 0.5-5 |
| Na$_2$O | 6-12 |
| K$_2$O | 0-6 |
| MgO | 0.5-4 |
| CaO | 1-4 |
| P$_2$O$_5$ | 2-8 |
| ZnO | 0-4 |
| Al$_2$O$_3$ | 0-3 |
| B$_2$O$_3$ | 2-8 |

* * * * *